Figure 1:
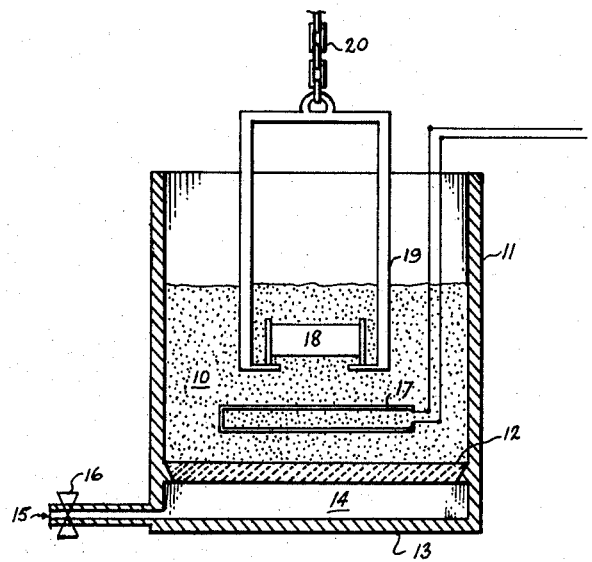

Jan. 21, 1964  C. R. BENNETT ETAL  3,118,773
METHOD OF PRESERVING FOODS BY HEATING IN A FLUIDIZED BED
Filed Oct. 14, 1960  2 Sheets-Sheet 1

INVENTORS
CHARLES R. BENNETT
CHARLES H. JUNG
GEORGE M. PIGOTT

Roy Mattern Jr.
ATTORNEY

INVENTORS
CHARLES R. BENNETT
CHARLES H. JUNG
GEORGE M. PIGOTT

Roy Mattern Jr.
ATTORNEY 3,118,773
METHOD OF PRESERVING FOODS BY HEATING IN A FLUIDIZED BED
Charles R. Bennett, Charles H. Jung, and George M. Pigott, Seattle, Wash., assignors to Turbo Dynamics Corporation, Seattle, Wash., a corporation of Washington
Filed Oct. 14, 1960, Ser. No. 62,661
10 Claims. (Cl. 99—182)

This invention relates to the preservation of foods wherein the preserving method involves heating.

This invention is a method of preserving foods by cleaning the foods; sizing the foods; placing the foods in containers; hermetically sealing the foods in the containers; applying heat to the filled and sealed containers by placing them in a fluidized heat transferring medium; keeping the food filled containers exposed to constant temperatures for a time period sufficient to destroy yeasts, molds and enzymes, and to destroy or render inactive any bacterial organisms likely to cause spoilage; cooling the filled and sealed food containers and cleaning the food containers, as may be necessary.

The purpose of preserving foods by utilizing this method is to acquire better food products and new food products.

An object in utilizing this method to preserve foods is to insure at all times that full preservation of a marketable food has been accomplished.

Another object in utilizing this method is to preserve foods without any substantial usage of fresh water which may be economically unavailable for competitive food processing.

Another object in utilizing this method to preserve foods is to derive better food products at significantly lower cost than the cost now associated with food products obtained by utilizing methods wherein steam is employed as the heat transferring medium.

This invention, its purpose and objects will be better understood by referring to the drawing and reading the following description of this new preserving method presented in reference to its historical sequence and with special emphasis on the utilization of the heat applying step wherein the sealed and filled food containers are placed in a fluidized heat transferring medium.

Figure 2:
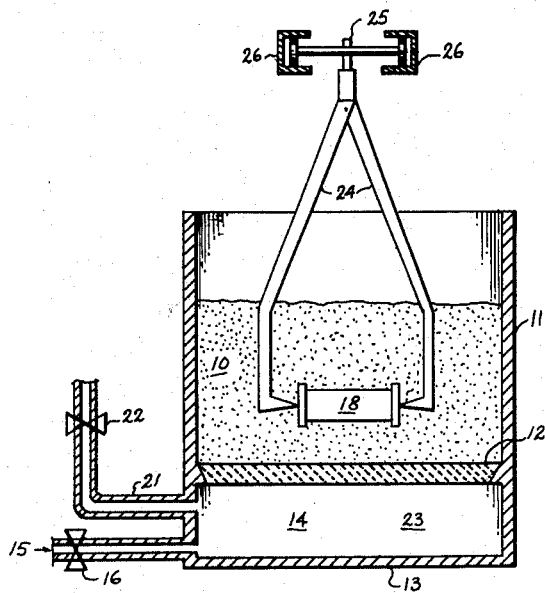
Figure 3:
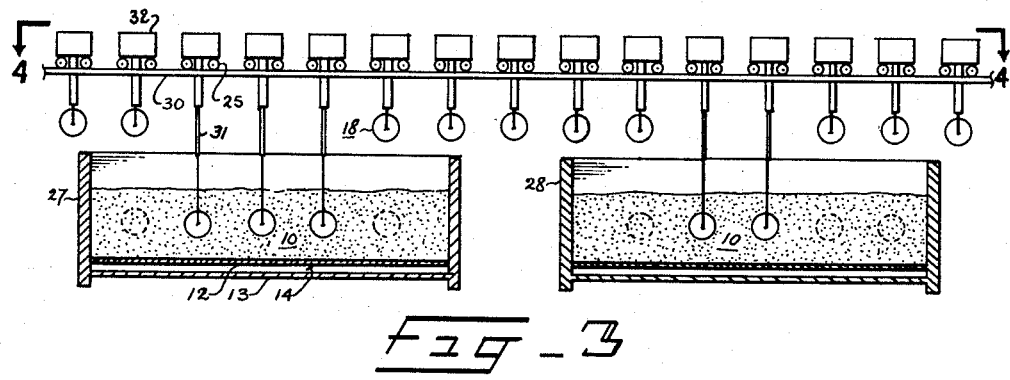
Figure 4:
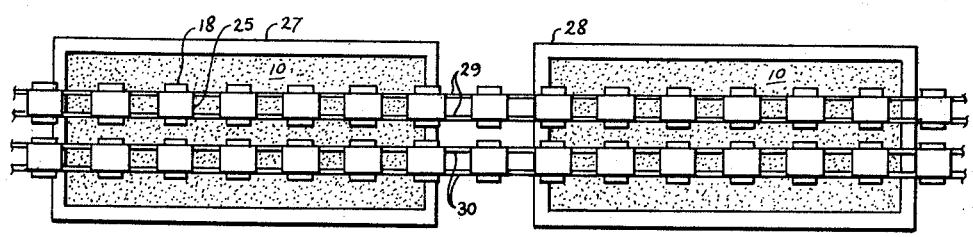
Figure 5:
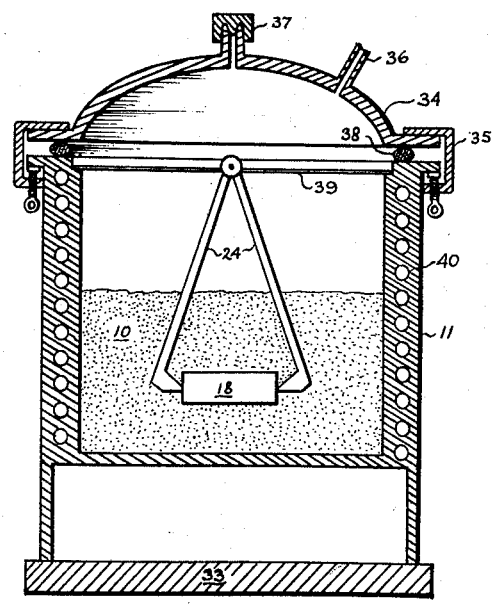

In the drawings:

FIGURE 1 is a diagrammatic sectional view of possibly the least complex equipment that could be utilized in performing the heating step of this food preserving method, FIGURE 2 is a diagrammatic sectional view of equipment designed for continuously performing this step of heating in contrast to a batch method of heating, FIGURE 3 is a sectional view of equipment designed for continuously performing the method when both hot and cold fluidized beds are simultaneously operated, FIGURE 4 is a top view of the equipment shown in FIGURE 3 indicating side by side independently operating food conveying mechanisms, and FIGURE 5 is a diagrammatic sectional view of a vibratory and pressurized fluidized bed equipment used in performing the heating step of this food preserving method.

In placing the cleaned and sized food in containers, sealing the containers, and thereafter heating the filled and sealed food containers in a fluidized heat transferring method as illustrated in these figures, the teachings of Nicholis Appert in the art of preserving foods are significantly supplemented once again as they have been on a few rare occasions in the past one hundred and fifty years.

At some time between 1804 and 1809, fifty years before Louis Pasteur's research concerning food spoilage, Nicholis Appert developed a method of preserving foods by heating filled, corked containers in boiling water. In preparing the foods he stressed extreme cleanliness and sanitation and further noted that careful sealing of the container was important. All his observations and instructions are just as important today as they were then, and the principles set forth by Appert are still the basis of modern food preserving techniques.

Other early pioneers in developing food preserving techniques realized that the length of time a food was processed at a given temperature had a definite bearing on whether or not the food was adequately preserved. Believing that the time period of heating might be reduced if higher temperatures could be reached, the early pioneers in 1861 added calcium chloride to the water that was heated raising the food preserving processing temperatures.

A much more satisfactory advance was made, however, in 1874 with the introduction and operation of the patented closed steam pressure retort or autoclave. Higher temperatures, previously unobtainable, were reached within the retorts, for the utilization of the pressure vessels made it possible to superheat steam thereby reaching higher temperatures during the food preserving operations. The increases in temperature necessarily required higher operating pressures.

This heating method centering on the retort that exclusively requires superheated steam as the heat transferring medium, is today, eighty-six years later, still completely relied upon throughout the food preserving industry when heating methods are used to preserve foods that are packed and sealed into containers.

Although the heating method has essentially remained static, other advances have been made. Commencing in 1900, the science of bacteriology was directed to the problems of preserving foods, and in the 1920's physical and bacteriological data was becoming available in sufficient quantities from reliable sources. This data helped the food preserving industry in calculating adequate heating times in reference to the temperatures to be maintained during the food preserving heating periods. This data and all additions to this wealth of information to date confirm the principles and theories of Nicholis Appert and the pioneers that followed him.

Also, while the heating method has essentially remained static, there have been notable improvements made in the development of sanitary types of containers, largely centering on the hermetically sealable containers made of glass and/or metals of special alloys and/or coated with special finishes such as tin coatings.

As in all arts their continual practice brings forth new data and new improvements, yet as noted previously, eighty-six years have passed since the introduction of the high pressure superheated steam retort which is still relied upon and serves as the backbone of the food preserving industry. It is further interesting to note that continuing work of scientists reveals data which strongly indicates that our present methods of preserving foods utilizing such superheated steam retorts could be substantially improved upon: if the heat source were more flexible and selective in the temperatures obtained with special emphasis on obtaining higher temperatures; if the heat source could be raised in temperature and lowered in temperature quickly; if the selected temperatures could be maintained with extreme accuracy, and if the heat transfer properties were of the highest order insuring the absolute penetration of the heat into the center and throughout the food within the hermetically sealed container.

These are some of the specifications that the scientists hope to have fulfilled. The operators of the food preserving businesses have other hopes, for they, like all other businessmen, are ever seeking to produce their products at lower cost while still maintaining or improving the product quality. They know such production success increases the market for their present and future food products.

Added to the scientists' list given above the operator's list is manifold. All operators would like to speed up the preserving processes utilizing either continuous processes or at least processes that require less heat-up and cool-down time than is now associated with processing in superheated steam retorts.

In addition, the operators in the food industry would like to avoid many of the operating, maintenance and safety problems now associated with food processing methods centering on the use of the superheated steam retorts. For example, there is always the need for inspection of the entire equipment with special emphasis on calibration and care of the instrumentation involved, and early detection of actual or potential equipment failures. Such inspections of all types of equipment throughout all industries are in order, but the standards set for the food preserving industry in reference to operating superheated steam retorts are necessarily high. Such inspections and the work associated with them place a high cost burden on this business which will continue until a different food preserving method is employed.

Furthermore, the operators, again with their attention directed to costs, both capital and operating, would welcome a new method involving the installation of equipment that for the initial capital investment would permit a higher production rate during the life of the equipment, inclusive of all considerations of inspection times, shut down times for repairs, heat-up and cool-down periods, and other similar non-productive operating times.

Moreover, operators today would welcome a new method that would involve the operation of heat transferring equipment that could be considered free of economic considerations centering on the availability of low cost fresh water supplies required for operating superheated steam retorts and accessory processing equipment.

In addition, they would also welcome a new method which could be accomplished by using reasonably mobile equipment rather than using stationary superheated steam retorts.

For all these reasons and many more known to all concerned with and skilled in the art of preserving foods by methods wherein the foods are heated in hermetically sealed containers, there is today, eighty-six years after the introduction of the superheated steam retorts, a great need for a new and better method.

This invention is that new method. In following the teachings now made available through the practice of this invention, foods are preserved by a new method that guarantees full compliance with the specification set forth by both the scientists and the operators.

This new method follows closely the old teachings as to the preliminary handling and preparation of the food. The food must be cleaned and sized in a sanitary environment. Thereafter the food is placed in clean containers and sealed under positive pressure, atmospheric pressure, or partial vacuum. After the sealing is completed, the containers are placed in, held and/or passed through a fluidized bed that is heated to a sufficiently high temperature to properly preserve the food contents of the containers during the time allotted to the heating step. Following the heating period, the containers may be cooled in air or water mediums or in a fluidized bed as may be specified for optimum processing requirements. Thereafter the exterior surfaces of the containers may be cleaned, if necessary.

The heating step carried on in the fluidized bed, followed when necessary by cooling in a fluidized bed, distinguishes this new method from former and current preserving methods relying on transferring heat within superheated steam retorts.

In these fluidized beds such as shown in FIGURES 1, 2, 3, and 4 solid particles are suspended in an upwardly moving stream of fluid resulting in a dense mass that uniformly behaves much like a liquid. The mass of these particles seeks its own level and has an apparent density much lighter than that of the solid particles when they are at rest and not in a moving stream of fluid. In the fluidized state the mass will exert a hydrostatic head. Differential pressures will occur between points at various depths in the bed. Moreover, the temperature will be consistent throughout the bed and every particle will be individually surrounded by a film of the moving fluid. These are the characteristics of the inert fluidized beds as well known and understood in the art (see United States Patents 2,729,428 and 2,771,648 and British Patent 732,101). These same characteristics can be obtained in a vibrating fluidized bed, see FIGURE 5.

When heat is applied to the fluidized bed, either externally or internally or both ways simultaneously by a heat source that is independent of or dependent on the moving stream of fluid, the continuous agitation of the bed particles insures that filled and sealed food containers will be heated rapidly and uniformly when placed in the fluidized bed. This is true for the tiny solid particles are constantly moving to and away from the containers of food in such a way that the exterior skin temperature of the food containers closely approximates the temperature of the fluidized bed.

To further enhance the rapidity and uniformity of the fluidized bed heating with respect to the food within the containers, the filled and sealed containers may be moved as necessary about their own axis or in some other direction during the heating period. This movement can be initiated by vibratory or rotative forces.

The preserving of some foods, especially when large containers are used, will require extra care to prevent the bursting of the containers. Either the containers must be sealed under sufficient vacuum or the heating must be undertaken within a pressurized chamber. Also both approaches could be combined. Containers under a slight initial vacuum could be heated within a slightly pressurized chamber.

This heating step of this new method of preserving food in containers wherein a fluidized bed is employed is better understood by referring to the drawing. In FIGURE 1, a fluidized bed 10 is shown in a diagrammatic sectional view in conjunction with supporting equipment arranged to illustrate a batch method of heating. The moving bed particles are referred to in general as the bed 10 and they are confined by the veritcal walled chamber 11 which could be of any desirable cross-section. The chamber 11 has a double bottom in effect, for a diffusion plate 12 is placed above the actual bottom 13 to form a plenum 14 which is connected to a pressurized fluid source (not shown) through the intake 15, having a control valve 16. As indicated previously, the fluidized bed lends itself well to any heat source, as for example the electrical resistance heating unit 17 located above the diffusion plate 12. The containers 18, first being filled and sealed, can be lowered into the bed 10 and removed, after the passage of a required thermal processing time at a specified temperature, by using a rack 19 and a lifting chain 20.

In FIGURE 2, another fluidized bed 10 is shown. Its construction is similar in many respects as indicated by the use of like numerals designating similar parts. However, the addition of the fuel line 21 and its control valve 22 illustrates that the plenum 14 can also double as a combustion chamber 23 so that the fluidizing can be done with hot gases. In addition, the equipment shown to handle the containers 18 is designed to indicate that the fluidized bed heating step of this new method lends itself to a continuous processing of the filled and sealed containers in contrast to the batch operations depicted in FIGURE 1. Container supporting hooks 24 are held at their tops by a chassis 25 which in turn is moved along conveyor tracks 26 by a power source (not shown).

In FIGURES 3 and 4, the utilization of two, closely located, fluidized beds is illustrated. One bed 27 is heated and the other bed 28 is cooled. Also the utilization of two independently operable and multiple speed conveyors 29 and 30 is shown in conjunction with these beds. Furthermore, telescoping mechanisms 31 may be hydraulically powered 32 are provided to raise and to lower the containers 18 into and out of the respective beds 27 and 28 at selected points of travel along the conveyors over the beds.

Utilization of this type of equipment or similar equipment, essentially in this operating sequence, provides the flexibility needed in preserving foods by this new method. Essentially all of the heating preserving specifications ever written or to be written can be complied with.

Heating periods can be adjusted critically for many variations of control times are available. Both the conveyor speeds and the actual distances traveled within the beds are adjustable. Moreover, the temperatures of both the high and low fluidized beds can be accurately maintained and quickly changed as necessary. In some instances the cool fluidized beds 28 may be bypassed when gradual room air temperature cooling is all that is necessary. However, in most preserving runs the filled containers will be controllably cooled in the cool fluidized bed to accurately comply with specified heating periods at constant temperatures.

This use of two fluidized beds, one hot 27, the other cold 28, provides the operator with a new overall operating method so he can meet all the regulatory food preserving specifications and at the same time produce a higher quality, better appearing, finer texture and increased nutritive food product. Furthermore, the operator can preserve foods previously thought to be not suitable for heat preserving methods that were essentially based on steam heated equipment.

Under certain circumstances where reasonably dry air and/or clean air is not available, or the air is only available from a cold temperature source, the fluidized bed may be activated by a conventional vibratory means 33 as shown in FIGURE 5. Such a means 33 supports the chamber 11 containing the fluidized bed 10. The solid particles of the bed 10 are agitated in a manner similar to solid particles of a "through" fluid flow fluidized bed such as shown in FIGURES 1, 2, 3 and 4. The chamber 11 has a pressure top 34 for use during pressurized heating periods. Multiple clamps 35 hold the top 34 in place. The pressurizing fluid enters at opening 36. There is a relief valve at 37 and a seal 38 is located between the top 34 and the chamber 11. The container 18 is supported by hooks 24 which in turn are held in a central position by the cross arm 39 which rests on the ledge of the chamber 11. The heating coils 40 provide adequate and variable temperature controls to maintain uniform heating temperatures in the fluidized bed 10.

Whether this new method of preserving foods is accomplished by using batch processing or continuous processing equipment, and regardless of the manner of obtaining fluidization, and irrespective of the pressures involved, the overall sole governing criterion as to the movements of the containers 18 is the time required in the fluidized beds 10 at their operating temperatures to guarantee the excellence of the food being preserved.

Because of the rapid heat transfer that occurs in fluidized beds the total processing times throughout the entire new method will be substantially less than those now associated with steam heated equipment. Moreover the temperatures that are obtainable in fluidized beds are independent of the operating pressures.

To summarize, the practice of this new method of preserving foods, wherein the method involves the step of heating in a fluidized bed and, as necessary, the step of cooling in a fluidized bed, provides the scientists and the operators with a method they now want and have awaited for eighty-six years. They now have a new method wherein the heat source is more flexible, being easily raised or lowered in temperature, the heat source can be controlled so that selected temperatures can be maintained with extreme accuracy, and the heat source has inherent heat transfer properties of the highest order insuring the fast and absolute penetration of the heat into the center and throughout the food within the hermetically sealed container.

The operators, in addition to getting all these scientific benefits, recognize that many investment and operating economies are also involved. The capital investment is lower. Repair and routine maintenance costs are down. Processing times throughout the new method are generally shorter. Continous operations in practicing the new method are feasible and economical. Safety problems are minimized. Fuel costs are lower. Fresh water requirements only pertain to cleaning, no longer being required during the heating and cooling steps. Instrumentation investments and maintenance costs are considerably lower. The chances of operational errors occurring are lessened so that the resulting preserved foods will almost always pass the food inspections. Moreover, close temperature control insures that the resulting preserved foods will be of the highest quality that possibly could be obtained from the food being processed.

We claim:

1. In a method of preserving foods, the steps of cleaning the foods; sizing the foods; placing the foods in containers; hermetically sealing the foods in the containers; applying heat to the filled and sealed containers by placing the containers in a fluidized heat transferring medium; keeping the food containers exposed to heat at constant temperatures for a time period sufficient to destroy yeasts, molds and enzymes, and to both destroy and render inactive any bacterial organisms in the food likely to cause spoilage; cooling the filled and sealed food containers, and cleaning the exteriors of the food containers, as may be necessary.

2. In a method of preserving foods, the steps of cleaning the foods; sizing the foods; placing the foods in containers; hermetically sealing the foods in the containers under a selected internal pressure; applying heat to the filled and sealed containers by placing the containers in a fluidized heat transferring medium; keeping the filled food containers exposed to heat at constant temperatures for a time period sufficient to both destroy and render inactive any bacterial organisms in the food and in the container likely to cause spoilage; cooling the filled and sealed containers, and cleaning the exteriors of the food containers, as may be necessary.

3. A food preserving method comprising the steps of cleaning the food; placing the food in containers; hermetically sealing the food in the containers under vacuum; applying heat to the filled and sealed food filled containers by placing the containers in a fluidized heat transferring medium; keeping food filled containers exposed to heat at selected temperatures for sufficient times to avoid all subsequent causes of food spoilage; cooling the filled and sealed food containers, and cleaning the exteriors of the food containers, as may be necessary.

4. A food preserving method comprising the steps of cleaning the food; placing the food in containers; hermetically sealing the food in the containers at ambient pressure; placing the containers in a heat transferring chamber containing fluidized particles; keeping the food filled containers exposed to the heated fluidized bed at selected temperatures for sufficient times to avoid all subsequent causes of food spoilage; cooling the filled and sealed food containers, and cleaning the exteriors of the food containers, as may be necessary.

5. A food preserving method comprising the steps of cleaning the food; placing the food in containers; hermetically sealing the food in the containers under a pressure higher than the ambient pressure; placing the food filled sealed containers into a fluidized bed heat transferring unit; keeping the food filled containers exposed to the heat at selected temperature and time to avoid all subsequent causes of food spoilage; cooling the containers, and cleaning the containers as necessary.

6. A food preserving method comprising the steps of cleaning the food; placing the food in containers; hermetically sealing the food in the containers at a selected pressure; heating the filled sealed containers in a pressurized and fluidized heat transferring bed; moving the containers within the said fluidized bed so the food filled containers are uniformly exposed to the heated particles at selected temperatures and times to avoid all subsequent causes of food spoilage; cooling the containers, and cleaning the containers as necessary.

7. A food preserving method comprising the steps of cleaning the food; placing the food in containers; hermetically sealing the food in the containers at a selected pressure; heating the containers in a temperature controlled fluidized bed under selected temperatures and for sufficient times to avoid all subsequent causes of food spoilage; cooling the containers in a temperature controlled fluidized bed to avoid over cooking; and cleaning the containers as necessary.

8. A food preserving method comprising the steps of cleaning the food; sizing the food; placing the food in containers; hermetically sealing the food in the containers; heating the food in the containers in a temperature controlled fluidized bed at correlated temperatures and times to destroy yeasts, molds, and enzymes, and to both destroy and render inactive any bacterial organisms in the food likely to cause spoilage; cooling the food in the containers in a temperature controlled fluidized bed to avoid over cooking; and cleaning the exteriors of the food filled containers.

9. A food preserving method comprising the steps of cleaning the food; sizing food; placing the food in containers; hermetically sealing the food in the containers; heating the sealed food filled containers within a temperature controlled fluidized medium at selected temperatures and times to avoid all subsequent causes of food spoilage; and cooling the sealed food filled containers in a temperature controlled fluidized medium at selected temperatures and times to avoid over cooking.

10. In a heat preserving method for foods, the steps of cleaning the food; grading the food; placing the food in clean containers; hermetically sealing the food in the containers; heating the filled food containers in a temperature controlled fluidized medium in various positions at respective temperatures and times to prevent all subsequent causes of food spoilage within the containers; cooling the filled food containers in a temperature controlled fluidized medium in various positions at respective temperatures and times to avoid over cooking; and as necessary cleaning the exterior of the containers.

References Cited in the file of this patent

UNITED STATES PATENTS

| | | |
|---|---|---|
| 2,729,428 | Milmore | Jan. 3, 1956 |
| 2,760,873 | Munz | Aug. 28, 1956 |
| 2,818,049 | Blaskowski et al. | Dec. 31, 1957 |
| 3,035,918 | Sorgenti et al. | May 22, 1962 |